US008992206B2

(12) United States Patent
Wakabayashi (10) Patent No.: US 8,992,206 B2
(45) Date of Patent: Mar. 31, 2015

(54) IMPRINT APPARATUS AND ARTICLE MANUFACTURING METHOD (75) Inventor: Kohei Wakabayashi, Utsunomiya (JP)

(73) Assignee: Canon Kabushiki Kaisha (JP)

(*) Notice: Subject to any disclaimer, the term of this patent is extended or adjusted under 35 U.S.C. 154(b) by 0 days.

(21) Appl. No.: 13/413,913

(22) Filed: Mar. 7, 2012

(65) Prior Publication Data
US 2012/0228789 A1 Sep. 13, 2012

(30) Foreign Application Priority Data
Mar. 7, 2011 (JP) ................... 2011-049604

(51) Int. Cl.
B29C 59/00 (2006.01)
B29C 37/00 (2006.01)
B29C 59/02 (2006.01)

(52) U.S. Cl.
CPC ............. B29C 59/02 (2013.01); B29C 37/0096 (2013.01); B29C 59/026 (2013.01); B29C 2037/90 (2013.01); B29C 2059/023 (2013.01); Y10S 977/887 (2013.01)
USPC .............. 425/385; 264/496; 264/39; 977/887

(58) Field of Classification Search
CPC ...... B29C 59/00; B29C 59/002; B29C 59/02; B29C 2059/023; B29C 2059/027; B29C 33/72; B29C 33/722
USPC .......................................... 425/385; 977/887
See application file for complete search history.

(56) References Cited

U.S. PATENT DOCUMENTS 4,998,428 A * 3/1991 Rechenbach ...................... 72/40
5,013,600 A * 5/1991 Da Re ......................... 428/316.6
5,137,440 A * 8/1992 Beckum et al. ............... 425/225
7,797,078 B2 9/2010 Sakano
8,616,873 B2 * 12/2013 Miller et al. .................. 425/385
8,770,964 B2 * 7/2014 Kawakami .................... 425/385
2002/0171173 A1 * 11/2002 Tsuchida ................. 264/272.17
2003/0172956 A1 * 9/2003 Hashi et al. ....................... 134/2
2004/0149312 A1 * 8/2004 Tsuchida ........................... 134/4

(Continued)

FOREIGN PATENT DOCUMENTS

JP 7-130638 A 5/1995
JP 2008-024441 A 2/2008
KR 20090109116 A 10/2009

OTHER PUBLICATIONS

Selenidis et al., Defect Reduction Progress in Step and Flash Imprint Lithography, Proc. of SPIE, vol. 6730 (2007), pp. 67300F-1 to 67300F-12.*
Singh et al., Cleaning of step-and-flash imprint masks with damage-free nonacid technology, J. Micro/Nanolith, MEMS MOEMS, vol. 9, No. 3 (2010), pp. 033003-1 to 033003-7.*

(Continued)

Primary Examiner — Matthew Daniels
(74) Attorney, Agent, or Firm — Rossi, Kimms & McDowell LLP (57) ABSTRACT An imprint apparatus which brings a resin on a substrate into contact with a pattern surface of a mold and cures the resin, includes a substrate holder which holds the substrate, a mold holder which holds the mold with a mold holding surface, a driving mechanism which moves the substrate holder relative to the mold holder, and a controller which controls the driving mechanism such that the substrate holder moves relative to the mold holder while the substrate holder holds a cleaning member instead of the substrate, and the cleaning member is in contact with the mold holding surface, thereby cleaning the mold holding surface.

13 Claims, 4 Drawing Sheets

(56) References Cited

U.S. PATENT DOCUMENTS

| | | | |
|---|---|---|---|
| 2005/0275125 A1* | 12/2005 | Kawakami et al. | 264/40.5 |
| 2006/0037700 A1* | 2/2006 | Shi et al. | 156/345.43 |
| 2006/0162739 A1* | 7/2006 | Sogard | 134/1 |
| 2008/0145773 A1* | 6/2008 | Wang et al. | 430/22 |
| 2008/0191372 A1* | 8/2008 | Takaoka | 264/39 |
| 2009/0267267 A1* | 10/2009 | Yoneda et al. | 264/293 |
| 2013/0196016 A1 | 8/2013 | Okushima et al. | |
| 2014/0083454 A1* | 3/2014 | Wakamatsu et al. | 134/4 |

OTHER PUBLICATIONS

Bailey et al., Step and flash imprint lithography: Template treatment, J. Vac. Sci. Technol. B, vol. 18, No. 6 (Nov./Dec. 2000), pp. 3572-3577.*

Korean Office Action cited in Korean counterpart application No. KR10-2012-0022757, dated Feb. 4, 2014.

Office Action issued in corresponding Japanese Patent Application No. 2011-049604 dated Oct. 31, 2014.

English Translation of Office Action issued in corresponding Japanese Patent Application No. 2011-049604 dated Oct. 31, 2014.

* cited by examiner

IMPRINT APPARATUS AND ARTICLE MANUFACTURING METHOD

BACKGROUND OF THE INVENTION

1. Field of the Invention

The present invention relates to an imprint apparatus and a method of manufacturing an article by using the apparatus.

2. Description of the Related Art

An imprint apparatus in which a substrate is coated with a resin, the resin is brought into contact with the pattern surface of a mold, and a pattern formed on the pattern surface of the mold is transferred onto the substrate by curing the resin by giving it energy such as light or heat is known.

If a foreign substance exists on a substrate holding surface for holding the substrate, the flatness of the substrate worsens. This may cause a transfer defect such as the distortion of the pattern to be transferred onto the substrate. Also, if a foreign substance exists on a mold holding surface for holding the mold, the mold may deform or incline. Accordingly, a transfer defect such as the distortion of the pattern to be transferred onto the substrate may occur.

SUMMARY OF THE INVENTION

The present invention provides a technique advantageous for removing a foreign substance existing on a substrate holding surface or mold holding surface in an imprint apparatus.

The first aspect of the present invention provides an imprint apparatus which brings a resin on a substrate into contact with a pattern surface of a mold and cures the resin, comprising: a substrate holder which holds the substrate; a mold holder which holds the mold with a mold holding surface; a driving mechanism which moves the substrate holder relative to the mold holder; and a controller which controls the driving mechanism such that the substrate holder moves relative to the mold holder while the substrate holder holds a cleaning member instead of the substrate, and the cleaning member is in contact with the mold holding surface, thereby cleaning the mold holding surface.

The second aspect of the present invention provides an imprint apparatus which brings a resin on a substrate into contact with a pattern surface of a mold and cures the resin, comprising: a substrate holder which holds the substrate with a substrate holding surface; a mold holder which holds the mold; a driving mechanism which moves the substrate holder relative to the mold holder; and a controller which controls the driving mechanism such that the substrate holder moves relative to the mold holder while the mold holder holds a cleaning member instead of the mold, and the cleaning member is in contact with the substrate holding surface, thereby cleaning the substrate holding surface.

The third aspect of the present invention provides an article manufacturing method comprising the steps of: forming a pattern of a resin on a substrate by using an imprint apparatus recited as the first or second aspect, and processing the substrate on which the pattern is formed in the forming step.

Further features of the present invention will become apparent from the following description of exemplary embodiments (with reference to the attached drawings).

DESCRIPTION OF THE EMBODIMENTS

Figure 1:
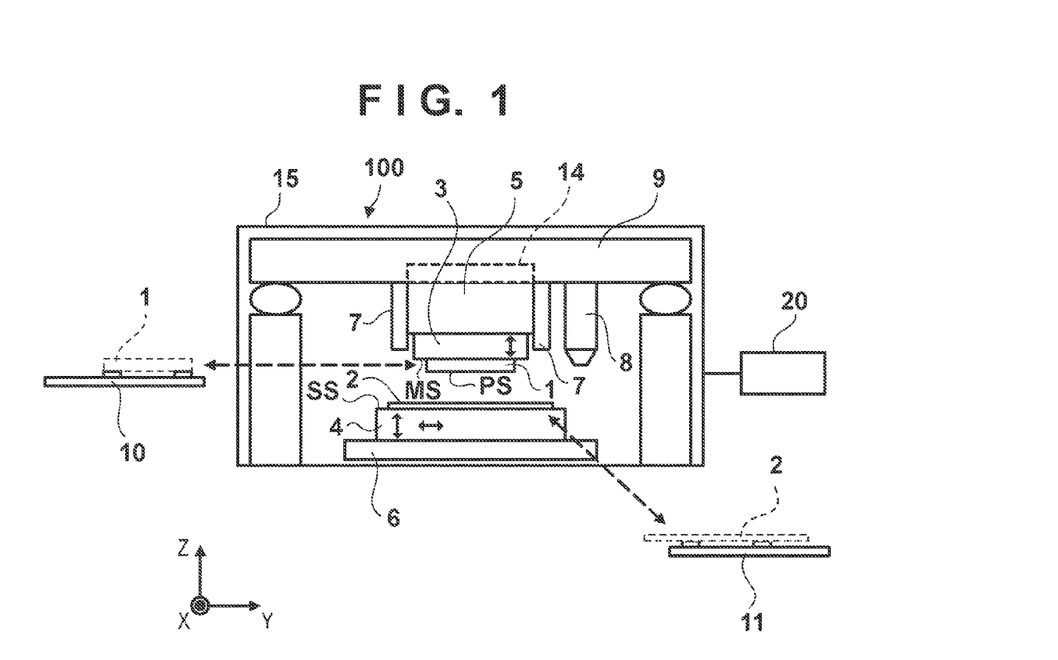
FIG. 1 is a view showing an imprint apparatus according to the first to third embodiments of the present invention.

The arrangement and basic operation of an imprint apparatus 100 according to the first to third embodiments will be explained below with reference to FIG. 1. Referring to FIG. 1, an X-Y-Z coordinate system is defined such that the horizontal plane corresponds to the X-Y plane, and the vertical direction corresponds to the Z-axis. In the imprint apparatus 100, a substrate 2 such as a wafer is coated with a resin, the resin is brought into contact with a pattern surface PS of a mold 1, and a pattern formed on the pattern surface PS is transferred onto the substrate 2 (or the resin) by curing the resin. The resin can be cured by giving it energy such as light or heat. The process of coating the substrate 2 with the resin and curing the resin while it is in contact with the pattern surface PS can be called an imprint process.

The imprint apparatus 100 includes a substrate holder 4 having a substrate holding surface SS for holding the substrate 2, and a substrate driving mechanism 6 for driving the substrate 2 by driving the substrate holder 4. The substrate driving mechanism 6 can have a function of driving the substrate holder 4 along and around the X-, Y-, and Z-axes, that is, six axes. A measurement device (for example, a laser interferometer or encoder) (not shown) measures the position of the substrate holder 4 or substrate 2, and a substrate position controller (not shown) controls the substrate driving mechanism 6 based on the result of the position measurement. The imprint apparatus 100 also includes a mold holder 3 having a mold holding surface MS for holding the mold 1, and a mold driving mechanism 5 for driving the mold 1 by driving the mold holder 3. The mold driving mechanism 5 can have a function of driving the mold holder 3 along and around the X-, Y-, and Z-axes, that is, six axes. A measurement device (for example, a laser interferometer or encoder) (not shown) measures the position of the mold holder 3 or mold 1, and a mold position controller (not shown) controls the mold driving mechanism 5 based on the result of the position measurement. The substrate driving mechanism 6 and mold driving mechanism 5 are driving mechanisms for moving the substrate holder 4 relative to the mold holder 3.

Moving the substrate holder 4 relative to the mold holder 3 includes moving the substrate holder 4 while the mold holder 3 is at rest, and moving the mold holder 3 while the substrate holder 4 is at rest. Also, moving the substrate holder 4 relative to the mold holder 3 includes moving both the mold holder 3 and substrate holder 4 such that the relative positions of the mold holder 3 and substrate holder 4 change.

The imprint apparatus 100 further includes a coating mechanism 8 for coating the substrate 2 with a resin, a curing unit 14 for curing the resin coating the substrate 2 by giving energy to the resin while the mold 1 is in contact with the resin, and a controller 20. The curing unit 14 can be configured to give light (for example, ultraviolet light) or heat to the resin coating the substrate 2. The light can be given to the resin through the mold 1. The mold driving mechanism 5 can be supported by a support member 9 supported via a vibration reduction mechanism.

A gas other than air can also be used in the internal space (a space in which the imprint process is performed) of the imprint apparatus 100. For example, when curing the resin in contact with the mold 1, pattern defects in the imprint process are reduced by replacing the surrounding air around the pattern surface PS with another gas. For example, helium, nitrogen, and various functional gases could be used. The imprint apparatus 100 can include an environment conditioner 7 in order to replace the gas in the space in which the imprint process is performed. The environment conditioner 7 can include a supply portion for supplying a gas to the space in which the imprint process is performed, and a suction portion for sucking the gas from the space.

The imprint apparatus 100 can include a substrate transporting mechanism 11 for transporting the substrate 2 to the substrate holder 4 and collecting the substrate 2 from the substrate holder 4, and a mold transporting mechanism 10 for transporting the mold 1 to the mold holder 3 and collecting the mold 1 from the mold holder 3. The imprint process can be executed by the following procedure under the control of the controller 20. First, the substrate driving mechanism 6 drives the substrate holder 4 such that a shot region of the substrate 2 is positioned immediately below the coating mechanism 8, and the coating mechanism 8 coats the shot region with a resin. Then, the substrate driving mechanism 6 drives the substrate holder 4 such that the shot region is positioned immediately below the mold 1. Subsequently, the mold driving mechanism 5 drives the mold holder 3 so that the pattern surface PS of the mold 1 comes in contact with the resin coating the shot region. The curing unit 14 cures the resin by giving it energy, thereby transferring a pattern formed on the pattern surface PS onto the substrate 2 (resin). After that, the same process is executed on a next shot region.

If a foreign substance adheres to the mold 1 or substrate 2, a defect may occur on the pattern to be transferred onto the substrate 2. Accordingly, the main body of the imprint apparatus 100 can be placed in a housing 15. A fan can supply air to the internal space of the housing 15 through a filter. The internal space of the housing 15 can be maintained at a pressure higher than that of the external space, that is, can be maintained at a positive pressure. Even when the housing 15 has a slight gap, therefore, the air flows out from the internal space of the housing 15 to the external space, and this prevents a foreign substance from entering the internal space from the external space. With this arrangement, the internal space of the housing 15 is kept cleaner than the clean room in which the imprint apparatus 100 is installed.

If a foreign substance exists on the mold holding surface MS of the mold holder 3, the mold 1 may deform or incline. This may cause a transfer defect such as the distortion of the pattern to be transferred onto the substrate 2. Also, if a foreign substance exists on the substrate holding surface SS of the substrate holder 4, the flatness of the substrate 2 worsens. Accordingly, a transfer defect such as the distortion of the pattern to be transferred onto the substrate 2 may occur. In addition, if a foreign substance exists on the mold holding surface MS and/or substrate holding surface SS, transfer defects may occur on all substrates until the foreign substance is removed.

Accordingly, in embodiments of the present invention to be explained below, a foreign substance existing of the mold holding surface MS and/or substrate holding surface SS is removed by using a cleaning member. A cleaning operation of the first embodiment of the present invention will be explained below with reference to FIG. 2. In the first embodiment, the mold holding surface MS of the mold holder 3 is cleaned by using a cleaning member 12. More specifically, the controller 20 causes the substrate holder 4 to hold the cleaning member 12 instead of the substrate 2. The cleaning member 12 can be transported to the substrate holder 4 by the substrate transporting mechanism 11, and held by the substrate holder 4 by using, for example, vacuum suction, electrostatic attraction, or a mechanical fixing mechanism. Then, the mold driving mechanism 5 drives the mold holder 3 in the Z-axis direction under the control of the controller 20, so as to bring the cleaning member 12 and mold holding surface MS into contact with each other. Subsequently, while the cleaning member 12 and mold holding surface MS are in contact with each other, the controller 20 controls the substrate driving mechanism 6 and/or mold driving mechanism 5, so that the substrate holder 4 moves relative to the mold holder 3. This relative movement can include moving the substrate holder 4 and/or mold holder 3 along the X-Y plane, or rotating the substrate holder 4 and/or mold holder 3 around an axis parallel to the Z-axis. Consequently, the mold holding surface MS is cleaned (that is, a foreign substance is removed from the mold holding surface MS) by friction with the cleaning member 12.

Cleaning can be executed based on an instruction supplied from an operator by using a console. Alternatively, the cleaning operation can be executed when the processing of a set number of substrates is complete or at a preset time. The cleaning operation can also be executed in a time zone during which no imprint process is executed.

Figure 3:
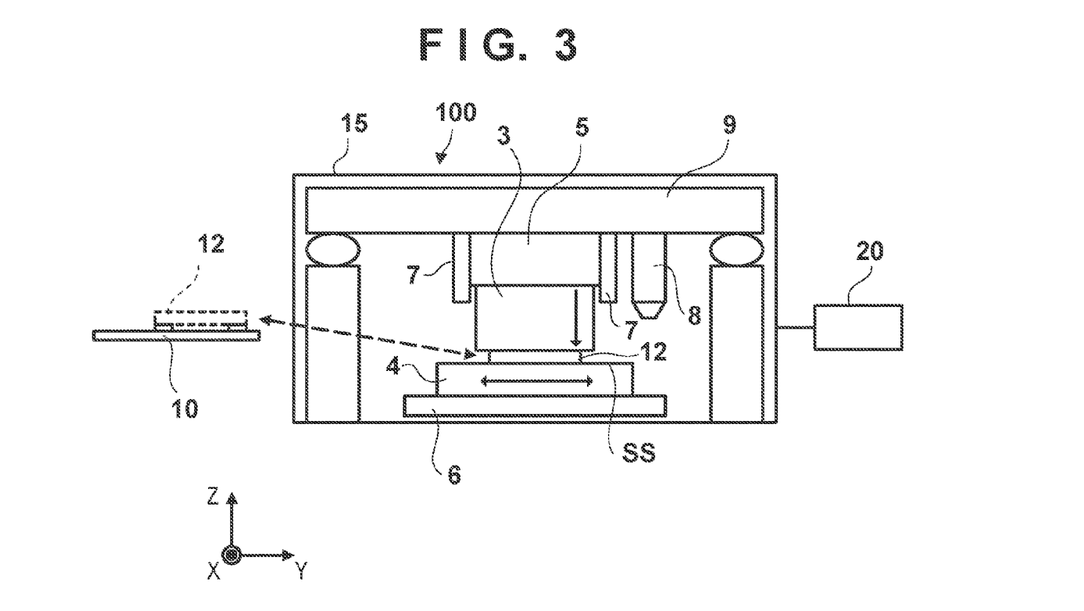
FIG. 3 is a view showing a cleaning operation of the second embodiment of the present invention.

A cleaning operation of the second embodiment of the present invention will be explained below with reference to FIG. 3. Note that features that are not particularly mentioned in the second embodiment can be the same as those of the first embodiment. In the second embodiment, the substrate holding surface SS of the substrate holder 4 can be cleaned by using a cleaning member 12. More specifically, the controller 20 causes the mold holder 3 to hold the cleaning member 12 instead of the mold 1. The cleaning member 12 can be transported to the mold holder 3 by the mold transporting mechanism 10, and held by the mold holder 3 by using, for example, vacuum suction, electrostatic attraction, or a mechanical fixing mechanism. Then, the mold driving mechanism 5 drives the mold holder 3 in the Z-axis direction under the control of the controller 20, so as to bring the cleaning member 12 and substrate holding surface SS into contact with each other. Subsequently, while the cleaning member 12 and substrate holding surface SS are in contact with each other, the controller 20 controls the substrate driving mechanism 6 and/or mold driving mechanism 5, so that the substrate holder 4 moves relative to the mold holder 3. This relative movement can include moving the substrate holder 4 and/or mold holder 3 along the X-Y plane, or rotating the substrate holder 4 and/or mold holder 3 around an axis parallel to the Z-axis. Consequently, the substrate holding surface SS is cleaned (that is, a foreign substance is removed from the substrate holding surface SS) by friction with the cleaning member 12.

Figure 4:
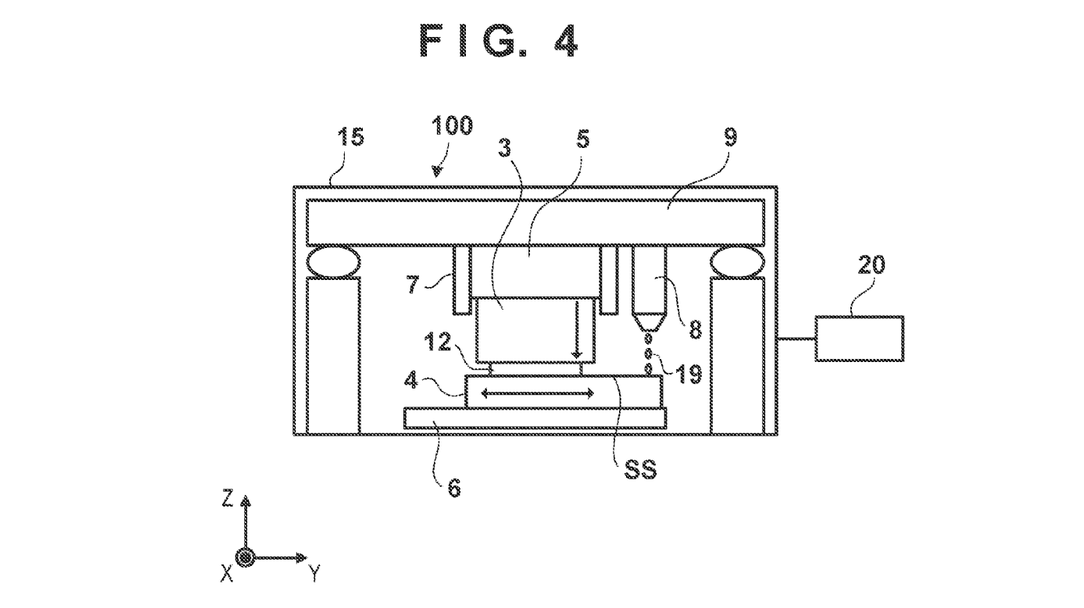
FIG. 4 is a view showing a cleaning operation of the third embodiment of the present invention.

A cleaning operation of the third embodiment of the present invention will be explained below with reference to FIG. 4. The third embodiment can be understood as a modification of the second embodiment, so features that are not mentioned in the third embodiment can be assumed to be the same as those of the second embodiment. In the third embodiment, the coating mechanism 8 supplies a cleaning solution 19 onto the substrate holding surface SS as a cleaning target. The cleaning solution can be, for example, alcohol, but may also be other various kinds of solutions. Although this embodiment uses the coating mechanism 8 as a supply mechanism for supplying the cleaning solution onto the substrate holding surface SS, the supply mechanism can also be different from the coating mechanism 8.

Figure 2:
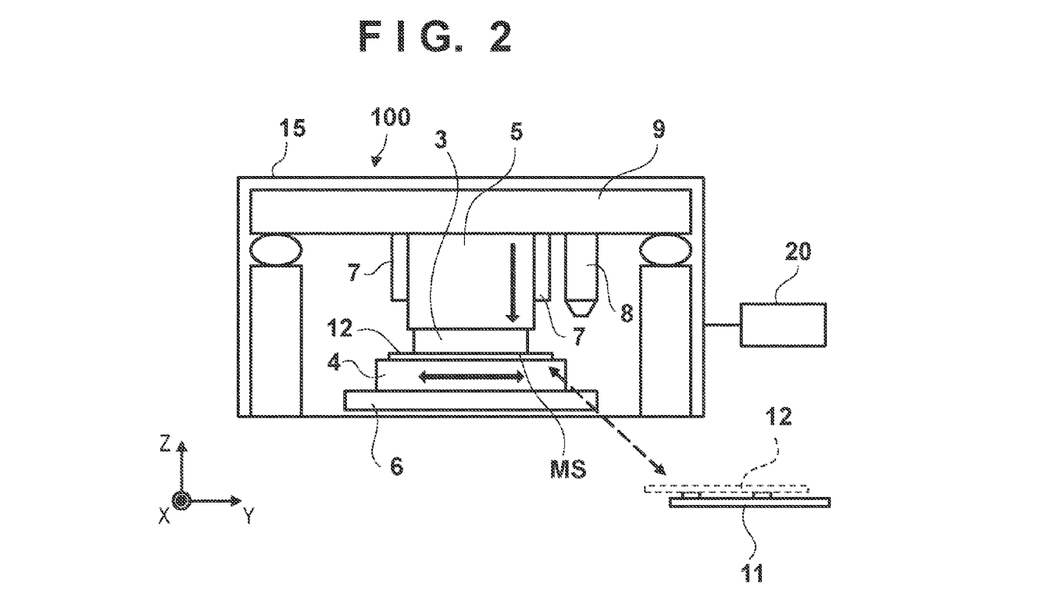
FIG. 2 is a view showing a cleaning operation of the first embodiment of the present invention.

Features common to the first to third embodiments will be explained below. In the first to third embodiments described above, the mold holder 3 is driven in the Z-axis direction in order to bring the mold 1 into contact with the substrate 2, the cleaning member 12 into contact with the mold holding surface MS, or the cleaning member 12 into contact with the substrate holding surface SS. However, this is merely one example form, and it is also possible to drive the substrate holder 4 in the Z-axis direction, or both the mold holder 3 and substrate holder 4 in the Z-axis direction.

The arrangement in which the mold holding surface MS or substrate holding surface SS is cleaned by holding the cleaning member 12 by the substrate holder 4 or mold holder 3 is excellent in that no additional driving mechanism for driving the cleaning member 12 is necessary. The cleaning member 12 can be stored in either the internal space or external space of the housing 15 of the imprint apparatus 100. An arrangement in which the cleaning member 12 is stored in the external space of the imprint apparatus 100 is advantageous in downsizing of the housing 15. Transporting the cleaning member 12 by using the substrate transporting mechanism 11 or mold transporting mechanism 10 obviates the need for an additional transporting mechanism.

The cleaning surface (the surface that comes in contact with a cleaning target) of the cleaning member 12 can include at least one of concentric grooves, grooves perpendicular to each other at equal intervals, and spiral grooves. The section of the groove can have, for example, a V or U shape. The cleaning member 12 can be accommodated in a cassette for accommodating the substrate 2, or in a dedicated cassette for accommodating the cleaning member 12. It is also possible to accommodate a plurality of cleaning members 12 having different cleaning effects (for example, the cleaning effect can change in accordance with the groove shape), and selectively use the plurality of cleaning members 12. In this case, the cleaning member 12 can be selected in accordance with a driving pattern (driving locus) when driving the substrate holder 4, or the type of foreign substance that attaches (for example, a foreign substance that attaches can change in accordance with a resin to be used).

The cleaning member 12 may also be transported by a transporting mechanism (for example, a dedicated transporting mechanism for transporting the cleaning member 12, or the above-described mold transporting mechanism 10) different from the substrate transporting mechanism 11. The shape of the cleaning member 12 can be the same as or different from that of the substrate 2. Alternatively, the shape of the cleaning member 12 can be a circle, rectangle, or another shape.

The cleaning member 12 can be made of, for example, ceramics. The cleaning member 12 can include a member having adhesive properties such as an adhesive tape. When using the cleaning member 12 including the adhesive member, the mold holder 3 and cleaning member (or substrate holder 4) can be brought into contact with each other by vertically moving the mold holder 3 and/or substrate holder 4. The mold holder 3 (or substrate holder 4) can also be cleaned by an operation like this.

The environment conditioner 7 can also be configured to suck a foreign substance removed from the mold holding surface of the mold holder 3 when the mold holding surface is cleaned, or blow off the foreign substance toward a collecting unit (not shown).

The imprint apparatus 100 can further include a detector for detecting the degree of the progress of cleaning of the mold holding surface MS or substrate holding surface SS. The detector can be configured to detect a force applied to the substrate holder 4 or mold holder 3 in the horizontal direction (the direction along the X-Y plane) during cleaning. The detector includes a strain gauge or the like, and detects a force applied to the substrate driving mechanism 6 or mold driving mechanism 5 owing to the relative motion of the cleaning member 12 with respect to a cleaning target (the mold holder 3 or substrate holder 4) during cleaning. Based on the change in this force, it is possible to detect the degree of the progress of cleaning, for example, the end of cleaning.

If the degree of the progress of cleaning is slower than a predetermined reference when cleaning the mold holding surface MS, the controller 20 increases the contact pressure between the cleaning member 12 and mold holding surface MS. Alternatively, if the degree of the progress of cleaning is slower than the predetermined reference when cleaning the substrate holding surface SS, the controller 20 increases the contact pressure between the cleaning member 12 and substrate holding surface SS. The mold driving mechanism 5 and/or substrate driving mechanism 6 can adjust the contact pressure between the cleaning member 12 and mold holding surface MS and that between the cleaning member 12 and substrate holding surface SS.

If the degree of the progress of cleaning is slower than the predetermined reference when cleaning the mold holding surface MS, the controller 20 may also execute a process of replacing the cleaning member 12 used with another cleaning member 12. Alternatively, if the degree of the progress of cleaning is slower than the predetermined reference when cleaning the mold holding surface MS, the controller 20 may also change the driving pattern of the substrate holder 4 and/or mold holder 3. Furthermore, the controller 20 can also determine the life (abrasion) of the cleaning member 12 based on the magnitude of the change in force before and after cleaning is performed for a predetermined time.

Figure 5:
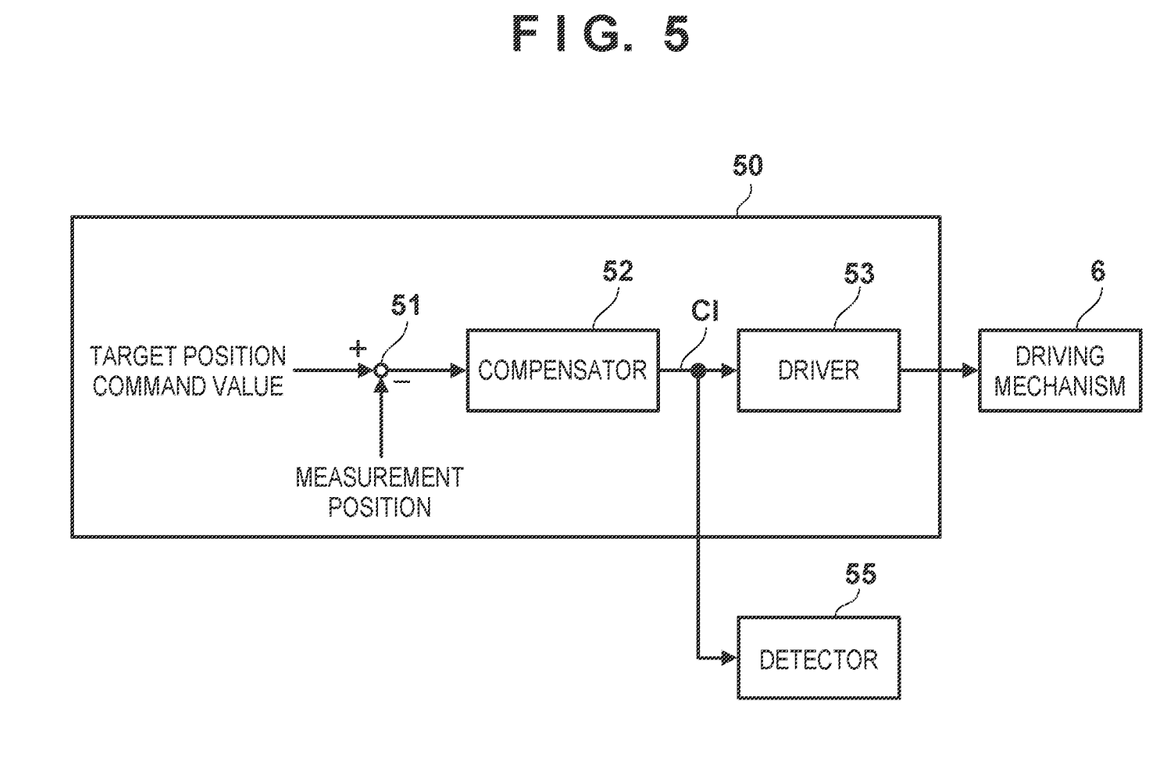
FIG. 5 is a view for explaining an arrangement example for detecting the degree of the progress of cleaning.

Another arrangement example for detecting the degree of the progress of cleaning will be explained below with reference to FIG. 5. Although an example in which the degree of the progress of cleaning is detected based on information in a control system for controlling the position of the substrate holder 4 will be explained, it is also possible to detect the degree of the progress of cleaning based on information in a control system for controlling the position of the mold holder 3. The control system for controlling the position of the substrate holder 4 includes the substrate driving mechanism 6, and a substrate position controller 50 for controlling the substrate driving mechanism 6. The substrate position controller 50 includes a deviation calculator 51, compensator 52, and driver 53. The substrate driving mechanism 6 includes an actuator such as a linear motor. The actuator converts an electric current supplied from the driver 53 into a mechanical force, and drives the substrate holder 4. The deviation calculator 51 calculates the difference between a target position command value provided by the controller 20 and a measurement position as the position of the substrate holder 4 provided by a measurement device (not shown), that is, calculates a control deviation. The compensator 52 determines a current command value CI based on the control deviation. The deriver 53 supplies an electric current to the substrate driving mechanism 6 in accordance with the current command value CI.

Figure 6A:
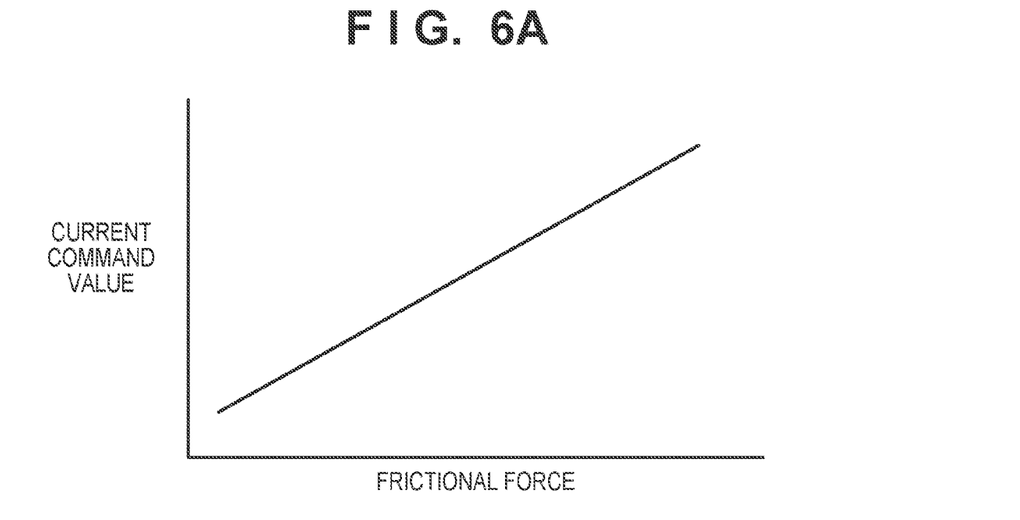
FIGS. 6A and 6B are graphs for explaining the degree of the progress of cleaning.

As exemplarily shown in FIG. 6A, if the frictional force between a cleaning target (the mold holder 3 or substrate holder 4) and the cleaning member 12 is large, the current command value CI to be supplied to the driver 53 in order to cancel the frictional force increases. Also, the frictional force between a cleaning target (the mold holder 3 or substrate holder 4) and the cleaning member 12 depends on the degree of adhesion of a foreign substance to the cleaning target. That is, the frictional force increases as the amount or strength of the adhesion of a foreign substance to a cleaning target increases. Accordingly, a detector 55 can detect the degree of the progress of cleaning based on the current command value CI. The current command value CI supplied to the driver 53 and the force required to move the substrate holder 4 relative to the mold holder 3 are equivalent physical amounts (convertible physical amounts), although the dimensions are different. Therefore, the operation of detecting the degree of the progress of cleaning based on the current command value CI is an example of the operation of detecting the degree of the progress of cleaning based on the force required to move the substrate holder 4 relative to the mold holder 3. When the current command value CI is large, the force required to move the substrate holder 4 relative to the mold holder 3 is large, and the degree of the progress of cleaning is low (the progress is slow). On the other hand, when the current command value CI is small, the force required to move the substrate holder 4 relative to the mold holder 3 is small, and the degree of the progress of cleaning is high (the progress is fast). That is, the degree of the progress of cleaning can be evaluated by the current command value CI.

Figure 6B:
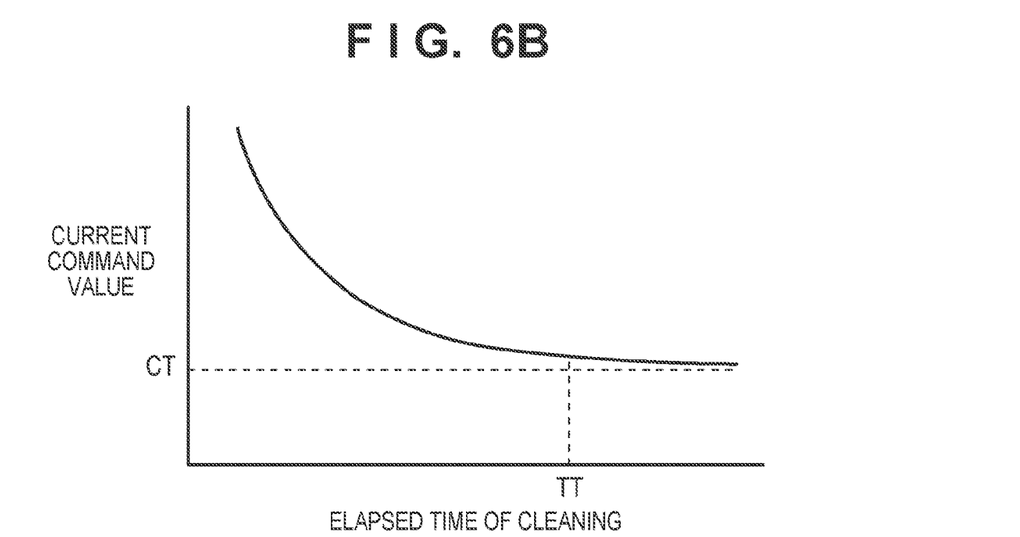

FIG. 6B exemplarily shows the relationship between the current command value CI and the elapsed time of cleaning. The controller 20 can be configured to increase the contact pressure between the cleaning member 12 and a cleaning target (the mold holder 3 or substrate holder 4) if the detection result of the detector 55, that is, the degree of the progress of cleaning is slower than a predetermined reference CT.

An article manufacturing method as an application example of the imprint apparatus of the present invention will be explained below. As an example of the article manufacturing method, a method of manufacturing a device (for example, a semiconductor integrated circuit device or liquid crystal display device) will be explained. This device manufacturing method includes a step of transferring (forming) a pattern onto a substrate (for example, a wafer, glass plate, or film-like substrate) by using the above-described imprint apparatus. This manufacturing method can further include a step of etching the substrate having the transferred pattern. Note that when manufacturing another article such as a patterned medium (recording medium) or optical device, the manufacturing method can include another step of processing the substrate having the transferred pattern, instead of the etching step.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-049604, filed Mar. 7, 2011, which is hereby incorporated by reference herein in its entirety.

What is claimed is:

1. An imprint apparatus which brings a resin on a substrate into contact with a pattern surface of a mold and cures the resin, comprising:
   a curing unit;
   a mold holder configured to hold a mold with a mold holding surface;
   a cleaning member configured to be capable of cleaning the mold holding surface by friction between the mold holding surface and the cleaning member;
   a substrate holder which is adapted to hold either a substrate or the cleaning member;
   a driving mechanism which moves the substrate holder relative to the mold holder; and
   a controller configured to control the driving mechanism to move the cleaning member relative to the mold holding surface when the mold holding surface is cleaned, such that the substrate holder moves relative to the mold holder to clean the mold holding surface by the friction between the mold holding surface and the cleaning member in a state that the substrate holder holds the cleaning member, and the cleaning member is in contact with the mold holding surface, the relative movement between the substrate holder and the mold holder including at least one of (i) a movement of at least one of the substrate holder or the mold holder in a direction along the mold holding surface, or (ii) a rotation of at least one of the substrate holder or the mold holder around an axis perpendicular to the mold holding surface.

2. The apparatus according to claim 1, further comprising a detector which detects a degree of progress of cleaning of the mold holding surface,
   wherein the controller terminates cleaning of the mold holding surface based on a detection result from the detector.

3. The apparatus according to claim 2, wherein the detector detects the degree of the progress of cleaning based on a force required to move the substrate holder relative to the mold holder.

4. The apparatus according to claim 2, wherein the controller increases a contact pressure between the cleaning member and the mold holder, if the degree of the progress of cleaning is slower than a predetermined reference.

5. The apparatus according to claim 1, wherein the cleaning member is made of ceramics.

6. The apparatus according to claim 1, further comprising:
   a unit configured to suck or blow off a foreign substance removed from the mold holding surface during the cleaning of the mold holding surface.

7. An imprint apparatus which brings a resin on a substrate into contact with a pattern surface of a mold and cures the resin, comprising:
   a curing unit;
   a substrate holder configured to hold a substrate with a substrate holding surface;
   a cleaning member configured to be capable of cleaning the substrate holding surface by friction between the substrate holding surface and the cleaning member;
   a mold holder which is adapted to hold either a mold or the cleaning member;
   a driving mechanism which moves the substrate holder relative to the mold holder; and
   a controller configured to control the driving mechanism to move the substrate holding surface relative to the cleaning member, when the substrate holding surface is cleaned, such that the substrate holder moves relative to the mold holder to clean the substrate holding surface by the friction between the substrate holding surface and the cleaning member in a state that the mold holder holds the cleaning member, and the cleaning member is in contact with the substrate holding surface, the relative movement between the substrate holder and the mold holder including at least one of (i) a movement of at least one of the substrate holder or the mold holder in a direction along the substrate holding surface, or (ii) a rotation of at least one of the substrate holder or the mold holder around an axis perpendicular to the substrate holding surface.

8. The apparatus according to claim 7, further comprising a detector which detects a degree of progress of cleaning of the substrate holding surface,
wherein the controller terminates cleaning of the substrate holding surface based on a detection result from the detector.

9. The apparatus according to claim 8, wherein the detector detects the degree of the progress of cleaning based on a force required to move the substrate holder relative to the mold holder.

10. The apparatus according to claim 8, wherein the controller increases a contact pressure between the cleaning member and the substrate holder, if the degree of the progress of cleaning is slower than a predetermined reference.

11. The apparatus according to claim 7, further comprising a supply mechanism which supplies a cleaning solution to the substrate holding surface.

12. The apparatus according to claim 7, wherein the cleaning member is made of ceramics.

13. The apparatus according to claim 7, further comprising:
a unit configured to suck or blow off a foreign substance removed from the substrate holding surface during the cleaning of the substrate holding surface.

* * * * *